US010900836B2

United States Patent
Gatto et al.

(10) Patent No.: US 10,900,836 B2
(45) Date of Patent: Jan. 26, 2021

(54) REFLECTOMETER, ELECTRONIC DEVICE AND METHOD

(71) Applicant: Sony Corporation, Tokyo (JP)

(72) Inventors: Alexander Gatto, Stuttgart (DE); Piergiorgio Sartor, Stuttgart (DE); Ralf Müller, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 12 days.

(21) Appl. No.: 16/099,693

(22) PCT Filed: May 24, 2017

(86) PCT No.: PCT/EP2017/062689
§ 371 (c)(1),
(2) Date: Nov. 8, 2018

(87) PCT Pub. No.: WO2017/203005
PCT Pub. Date: Nov. 30, 2017

(65) Prior Publication Data
US 2019/0086263 A1 Mar. 21, 2019

(30) Foreign Application Priority Data

May 24, 2016 (EP) .................................. 16171034

(51) Int. Cl.
*G01J 3/42* (2006.01)
*G01J 1/42* (2006.01)
(Continued)

(52) U.S. Cl.
CPC ............ *G01J 3/42* (2013.01); *G01J 1/4204* (2013.01); *G01J 3/0264* (2013.01);
(Continued)

(58) Field of Classification Search
CPC .......... G01J 3/42; G01J 1/4204; G01J 3/0264; G01J 3/0278; G01J 3/0297; G01J 3/28; G01J 2003/425
See application file for complete search history.

(56) References Cited

U.S. PATENT DOCUMENTS

| 6,844,931 B2 | 1/2005 | Ehbets | |
|---|---|---|---|
| 2003/0169421 A1* | 9/2003 | Ehbets | G01J 3/02 356/328 |

(Continued)

FOREIGN PATENT DOCUMENTS

| EP | 1 314 972 A1 | 5/2003 |
|---|---|---|
| WO | 2015/112335 A1 | 7/2015 |
| WO | 2015/152946 A1 | 10/2015 |

OTHER PUBLICATIONS

Marquez, G. and Wang, L.V., "White light oblique incidence reflectometer for measuring absorption and reduced scattering spectra of tissue-like turbid media," (C) 1997 OSA, Optics Express 454, Dec. 22, 1997, vol. 1, No. 13, pp. 455-460.

(Continued)

*Primary Examiner* — Dominic J Bologna
(74) *Attorney, Agent, or Firm* — Xsensus LLP

(57) ABSTRACT

A reflectometer has a depth sensor which obtains distance information between the depth sensor and an object, a light source which emits light having a calibrated light spectrum, a spectral sensor which collects spectral information from light reflected from the object, and a circuitry. The circuitry calculates a reflectance spectrum for the object based on the distance information and the spectral information collected from light being reflected from the object, wherein the light originates from the light source.

20 Claims, 4 Drawing Sheets

(51) Int. Cl.
*G01J 3/02* (2006.01)
*G01J 3/28* (2006.01)

(52) U.S. Cl.
CPC ........... *G01J 3/0278* (2013.01); *G01J 3/0297* (2013.01); *G01J 3/28* (2013.01); *G01J 2003/425* (2013.01)

(56) References Cited

U.S. PATENT DOCUMENTS

| | | |
|---|---|---|
| 2007/0046941 A1 | 3/2007 | Mestha et al. |
| 2015/0001664 A1 | 1/2015 | Van Der Tempel et al. |
| 2016/0025642 A1 | 1/2016 | Choulet |
| 2016/0109292 A1* | 4/2016 | Park .................... G01J 3/2823 356/402 |
| 2016/0307064 A1* | 10/2016 | Cooke .................... G01N 33/00 |

OTHER PUBLICATIONS

International Search Report and Written Opinion for International Application No. PCT/EP2017/062689, dated Aug. 24, 2017.

\* cited by examiner

US 10,900,836 B2

REFLECTOMETER, ELECTRONIC DEVICE AND METHOD

CROSS-REFERENCE TO RELATED APPLICATIONS

This application is a National Stage Application based on PCT/EP2017/062689, filed 24 May 2017, and claims priority to European Patent Application No. 16171034.8 filed 24 May 2016, the entire contents of which being incorporated herein by reference.

TECHNICAL FIELD

The present disclosure generally pertains to a reflectometer, an electronic device and a method.

TECHNICAL BACKGROUND

Generally, it is known to integrate spectral sensing technologies into devices, for example, wearable devices, smartphones, and the like. By analyzing the spectral reflectance, information about the material which reflected incident light can be gathered.

Although there exist techniques for spectral sensing, it is generally desirable to provide a reflectometer, an electronic device and a method for providing a reflectance spectrum.

SUMMARY

According to a first aspect, the disclosure provides a reflectometer comprising a depth sensor configured to obtain distance information between the depth sensor and an object, a light source for emitting light having a calibrated light spectrum, a spectral sensor configured to collect spectral information from light reflected from the object, and a circuitry configured to calculate a reflectance spectrum for the object based on the distance information and the spectral information collected from light being reflected from the object, the light originating from the light source.

According to a second aspect, the disclosure provides an electronic device comprising a reflectometer, including: a depth sensor configured to obtain distance information between the depth sensor and an object, a light source for emitting light having a calibrated light spectrum, a spectral sensor configured to collect spectral information from light reflected from the object, and a circuitry configured to: calculate a reflectance spectrum for the object based on the distance information and the spectral information collected from light being reflected from the object, the light originating from the light source, the electronic device further comprising a circuitry configured to identify a characteristic of the object on the basis of the reflectance spectrum.

According to a third aspect, the present disclosure provides a method of determining a reflectance spectrum of an object comprising: obtaining distance information between a depth sensor and an object, emitting a calibrated light spectrum from a light source, collecting spectral information from light reflected from the object, and calculating a reflectance spectrum for the object based on the distance information and the spectral information collected from light being reflected from the object, the light originating from the light source.

Further aspects are set forth in the dependent claims, the following description and the drawings.

BRIEF DESCRIPTION OF THE DRAWINGS

Embodiments are explained by way of example with respect to the accompanying drawings, in which:

FIG. 3b illustrates a second measurement for obtaining a reflectance spectrum, wherein the light source of the mobile reflectometer is switched on;

DETAILED DESCRIPTION OF EMBODIMENTS

Figure 1:
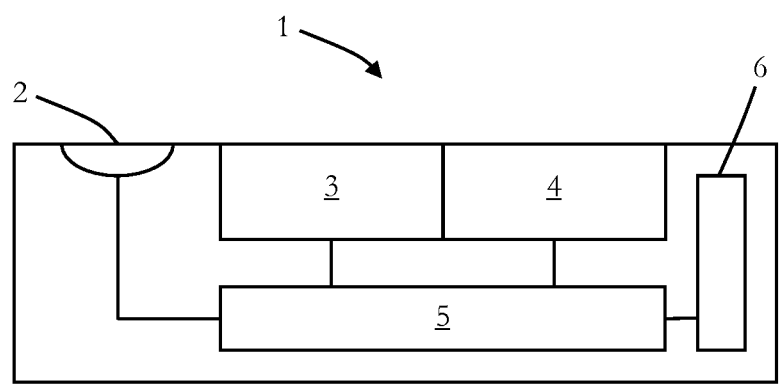
FIG. 1 illustrates an embodiment of a mobile reflectometer.

Before a detailed description of the embodiments under reference of FIG. 1, general explanations are made.

As also mentioned in the outset, there is a need to integrate spectral sensing technologies in wearables and other smaller mobile devices.

In order to avoid that ambient light is mainly detected, known spectral sensors are typically designed to be used in direct contact with an object to be analyzed.

However, for users of a spectral sensing device or a device having a spectral sensor, it may inconvenient or even impossible to locate the sensor directly at the object to be analyzed.

It has been recognized that an external known light source could be used, but that this external light source may not sufficient to solve ambiguity problems caused by intensity changes due to different distances between a spectral sensor and different objects. Alternatively, a light source employed for spectral sensing might be operated at higher power levels such that the amount of light reflected from an object to be analyzed is higher compared to ambient light reflected from the object.

However, this may still not be sufficient for an accurate and absolute measurement in terms of reflectance.

Hence, in some embodiments, a depth sensor, a spectral sensor and a light source for emitting light having a calibrated light spectrum are provided within a device, e.g. an electronic device, a mobile reflectometer, or the like, thereby addressing the above-mentioned issues of the prior art at least partially and allowing remote reflectance sensing.

In particular, some embodiments pertain to a mobile reflectometer including a depth sensor configured to obtain distance information between the depth sensor and an object, e.g. an object which is to be analyzed. Further, the mobile reflectometer includes a light source for emitting light having a calibrated light spectrum, a spectral sensor configured to collect spectral information from light reflected from the object, and a circuitry. The circuitry is configured to calculate a reflectance spectrum for the object based on the distance information and the spectral information collected from light being reflected from the object, the light originating from the light source.

The depth sensor may be based on a stereo camera, time-of-flight (TOF) camera, or the like. The depth sensor may output depth information, e.g. a depth map or other depth data, which indicate the distance between the depth sensor and the object to be analyzed. The distance may be directly included in the depth information or other data which is output by the depth sensor. The distance may also be indirectly included in the depth information and the distance itself may be derived by the circuitry on the basis of the depth information received from the depth sensor. The depth sensor may also (only) output data or information which is indicative of the distance between the depth sensor and the object, while the distance itself is determined by the circuitry. In other words, the depth sensor may be configured to directly determine the distance between the depth sensor and the object and/or to indirectly determine the distance between the depth sensor and the object, e.g. by taking image data or the like which includes depth information or other information being indicative for the distance. As mentioned, the circuitry may determine the distance on the basis of the distance information provided by the depth sensor.

In a stereo camera, typically, two image sensors with a known distance may be provided. By taking an image with each of the two sensors, two images which are shifted to each other are obtained and on the basis of these images, the distance to an object can be determined. In the time-of-flight technology, a distance to an object may be directly measured by the time of flight of light which is emitted from a light source, reflected from the object and detected by a sensor of the time-of-flight sensor.

Generally, the light source can be any kind of light source and may be, for example, a tungsten light source ((filament) bulb, halogen bulb, or similar), a LED (light emitting diode) based light source, a light source which is an electric-discharge lamp, e.g. a xenon lamp, etc.

The light source emits light which has a calibrated light spectrum. This may be achieved by having a calibrated light source. It can also be achieved by determining a calibrated light spectrum, e.g. by measuring the light spectrum. Calibrating of a light source can be done, for example, by emitting light from the light source on a known plane (white paper, or similar), and measuring the light reflected from the plane. Thereby, the light spectrum can be determined.

The calibrated light spectrum may be known, and, for example, stored in a memory of the mobile reflectometer. The calibrated light spectrum may be known from the calibrated light source, which provides, for example, information about the calibrated light spectrum emitted by the light source. The calibrated light spectrum may also be known from the discussed determination of the calibrated light spectrum (e.g. calibration) of the light source which is done, for example, by the circuitry.

The calibrated light spectrum may include information about the intensity in dependence on wavelength of light. The calibrated light spectrum may cover a predefined wavelength range, e.g. wavelength range of visible light, ultraviolet, and/or infrared light spectrum, etc. The calibrated light spectrum may have a predefined accuracy. The present disclosure is not limited to a specific form, accuracy, data form, or the like of the calibrated light spectrum.

The spectral sensor may include, for example, a grating, prism or similar for dispersing incident light in accordance with its color (wavelength). The dispersed light may be detected with an image sensor, pixel detector or the light, such that dispersed light can be detected in accordance with its wavelengths.

The spectral sensor collects spectral information from light which is reflected from the object. The spectral information may include information about the intensity of a specific wavelength of light. The resolution of the spectral information may depend on the type and form of the spectral sensor used and it can be adapted to the specific purposes of the embodiments.

As mentioned, the circuitry is configured to calculate a reflectance spectrum for the object based on the distance information and the spectral information collected from light being reflected from the object, the light originating from the light source. The reflectance, as will also be discussed below, is defined as the fraction of the reflected power of light (intensity) of the incident power of light (intensity). The reflectance spectrum may include information of the reflectance for different wavelengths.

As the light source emits a calibrated light spectrum and as the distance between the light source and the object may be known, for instance, since the distance between the depth sensor and the light source is known, it is possible to determine the (exact or nearly) amount of light (power, intensity) at the position of the object, which, in turn, allows to calculate an absolute reflectance spectrum. This is in contrast, for example, to cases where the exact amount of light at the position of the object is not used and where consequently only, for example, a relative reflectance spectrum could be calculated.

The circuitry may be further configured to calculate the reflectance spectrum for the object based on spectral information collected from ambient light being reflected from the object. Ambient light cannot be avoided in some embodiments, such that the ambient light can be taken into account for the calculation of the reflectance spectrum.

Correspondingly, the circuitry may be further configured to calculate a difference between the ambient light spectral information being representative of a light spectrum of ambient light being reflected from the object and the calibrated light spectral information being representative of a light spectrum of light originating from the light source and being reflected from the object. Thereby, the influence of the ambient light can be compensated and the (exact or nearly) amount of light (power, intensity) at the position of the object can be determined.

In some embodiments, the circuitry is further configured to drive the light source and the spectral sensor such that the spectral sensor collects first spectral information during an off-state of the light source, where the light source does not emit light, and collects second spectral information during an on-state of the light source, where the light source emits light.

The circuitry may further be configured to calculate a difference between the second spectral information and the first spectral information. Thereby, the influence of the ambient light can be compensated, since by performing the subtraction between the first spectral information and the second spectral information, the (pure) spectral information of the light reflected by the object and origination from the light source can be obtained.

Hence, the circuitry may be further configured to calculate the reflectance spectrum based on the difference between the second spectral information and the first spectral information and the calibrated light spectrum emitted from the light source. Thereby, as discussed, the absolute reflectance spectrum can be obtained.

The circuitry may be further configured to identify a characteristic of the object on the basis of the reflectance spectrum. For example, multiple reflectance spectra being indicative for specific objects, object characteristics, object materials, etc. may be predefined and, for example, stored in a storage, database or the like. By comparing the calculated reflectance spectrum with the predefined reflectance spectra, a reflectance spectrum having the strongest similarity can be identified and the respective characteristics of the object can be identified. The storage may be a hard disk, compact disc, solid state drive, etc. The storage may be included in the mobile reflectometer or it may be accessible via a connection, such as a network connection, wireless connection, the internet, etc.

Some embodiments pertain to an electronic device which includes a reflectometer as described herein as mobile reflectometer. As mentioned above, the reflectometer may include a depth sensor configured to obtain distance information between the depth sensor and an object, a light source for emitting light having a calibrated light spectrum, a spectral sensor configured to collect spectral information from light reflected from the object, and a circuitry configured to calculate a reflectance spectrum for the object based on the distance information and the spectral information collected from light being reflected from the object, the light originating from the light source. The electronic device may further include a circuitry configured to identify a characteristic of the object on the basis of the reflectance spectrum. The circuitry of the reflectometer and the electronic device may be the same, they may partially overlap or they may be separated from each other. The electronic device may be a mobile electronic device or a non-mobile electronic device. It may be a digital camera, mobile phone, smart phone, tablet computer, a wearable device (wristband, watch, glasses, etc.), laptop computer, or the like.

Some embodiments pertain to a method of determining a reflectance spectrum of an object including obtaining distance information between a depth sensor and an object, emitting a calibrated light spectrum form a light source, collecting spectral information from light reflected from the object, and calculating a reflectance spectrum for the object based on the distance information and the spectral information collected from light being reflected from the object, the light originating from the light source. The method may be performed by the reflectometer or by the electronic device described herein. In particular, it may be performed by the circuitry of the reflectometer and/or of the electronic device described herein. Of course, the disclosure as made in connection with the reflectometer and the electronic device also applies to the method.

As mentioned, the light source may be a calibrated light source. Alternatively, the method may include determining the calibrated light spectrum, as discussed above. The method may further include calculating the reflectance spectrum for the object based on spectral information collected from ambient light being reflected from the object, as discussed above. The method may further include calculating a difference between the ambient light spectral information being representative of a light spectrum of ambient light being reflected from the object and the calibrated light spectral information being representative of a light spectrum of light originating from the light source and being reflected from the object, as discussed above. The method may further include collecting first spectral information during an off-state of the light source, what the light source does not emit light, and collects second spectral information during an on-state of the light source, where the light source emits light, as discussed above.

The method may further include calculating a difference between the second spectral information and the first spectral information. The method may further include calculating the reflectance spectrum based on the difference between the second spectral information and the first spectral information and the calibrated light spectrum emitted from the light source, as discussed above. The method may further include identifying a characteristic of the object on the basis of the reflectance spectrum, as discussed above. The identifying may include comparing of the calculated reflectance spectrum with a number of predefined reflectance spectra.

The methods as described herein are also implemented in some embodiments as a computer program causing a computer and/or a processor to perform the method, when being carried out on the computer and/or processor and/or circuitry. In some embodiments, also a non-transitory computer-readable recording medium is provided that stores therein a computer program product, which, when executed by a processor, such as the processor described above, causes the methods described herein to be performed.

Returning to FIG. 1, an embodiment of a mobile reflectometer 1 ("reflectometer 1" hereinafter) is illustrated.

The reflectometer 1 has a calibrated light source 2, a depth sensor 3, a spectral sensor 4, a processor 5 and an interface 6.

The light source 2 is a calibrated xenon light source in this embodiment, without limiting the present disclosure in that regard. The depth sensor 3 is based on a stereo camera in this embodiment, providing a depth map D which is indicative of the distance between the depth sensor 3 and an object, without limiting the present disclosure in that regard. The spectral sensor 4 is configured to detect a light wavelength spectrum of incident light, and it has a grating which disperses incident light base on the wavelength and an image sensor for detecting the dispersed light (not shown). The present disclosure is no limited to this specific spectral sensor 4.

The processor 5 may be the circuitry of the reflectometer 1 as discussed above. However, in other embodiments, the processor 5 together with the interface 6, the light source, 2 the depth sensor 3, and/or the spectral sensor 4 may form (at least partially) the circuitry.

Figure 2:
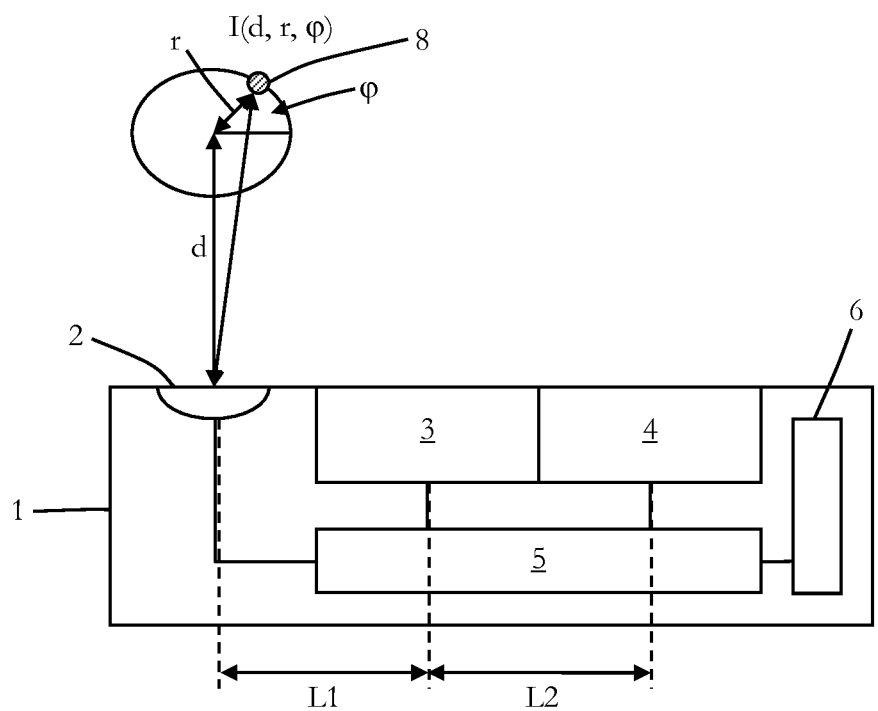
FIG. 2 illustrates the intensity of light emitted from a light source of the mobile reflectometer.

The function of the reflectometer 1 will be described under reference of FIGS. 2 to 4 in the following.

The light source 2 is calibrated in a sense that its characteristics in emitting light in terms of intensity depending from its spatial position in position in space is known (also referred to as "calibrated light spectrum" above). This can be expressed, for example, with cylindrical coordinates $(d, r, \varphi)$ and the respective known intensity at the respective coordinates, which is further denoted as $I(d, r, \varphi)$ in the following discussion.

In the present embodiment, the light source 2, the depth sensor 3 and the spectral sensor 4 are integrated in the reflectometer 1, and the relative distances are known. For instance, the distance L1 between the light source 2 and the depth sensor 3 and the distance L2 between the depth sensor 3 and the spectral sensor 4 are known.

In the present embodiment, the depth sensor 3 and spectral sensor 4 are placed side by side without separation, such that the distance L2 is small. In some embodiments, the depth sensor 3 and the spectral 4 are integrated into one silicon sensing unit, are located at the same substrate or similar, in order to further reduce the distance between the depth sensor 3 and the spectral sensor 4.

Figure 3A:
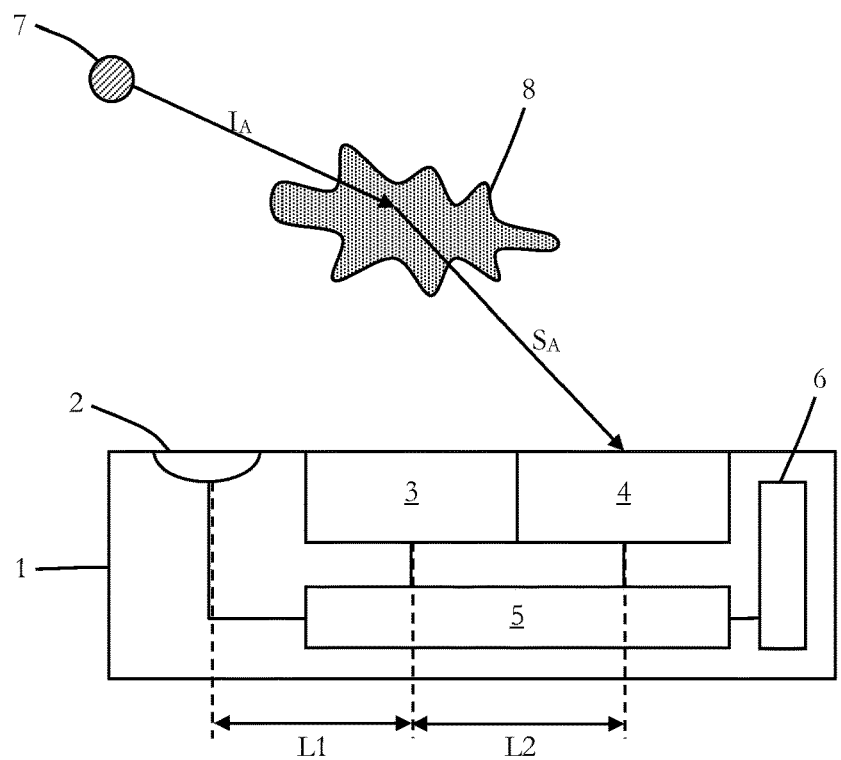
FIG. 3a illustrates a first measurement for obtaining a reflectance spectrum, wherein the light source of the mobile reflectometer is switched off.
Figure 3B:
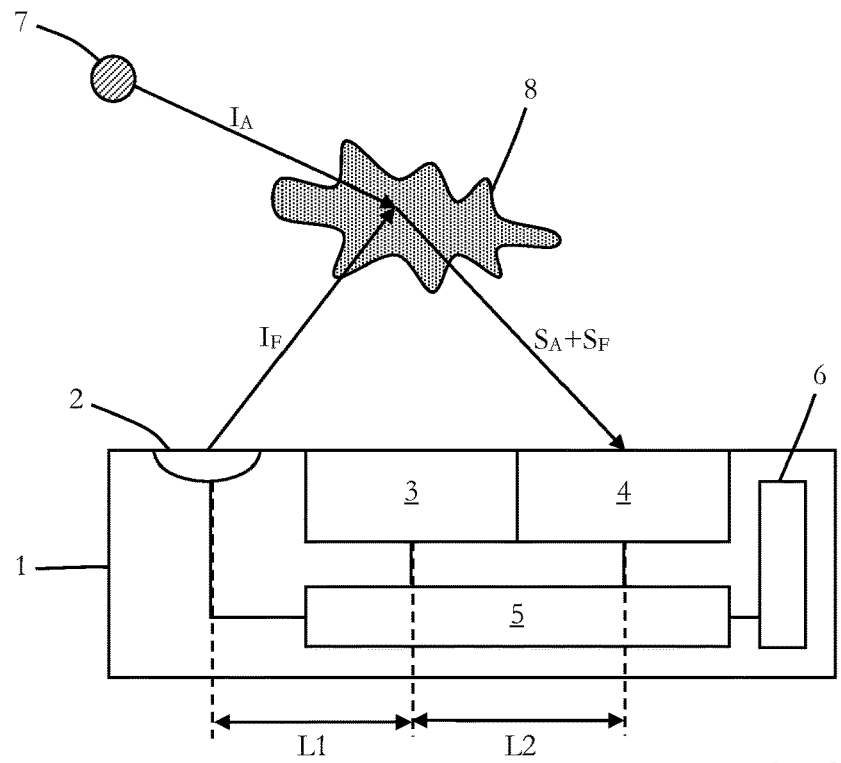

In the following, the measurement of the reflectance of an object of interest, such as object 8 in FIGS. 3a and 3b, is discussed.

The measurement of the reflectance for the object 8 is done by performing two spectral measurements, wherein FIG. 3a illustrates a first measurement and FIG. 3b illustrates a second measurement.

A first measurement takes place (FIG. 3a), when the light source is switched off, e.g. by the processor 5, such that only light from an ambient light source 7, such as the sun or other light source, is present.

Then, the processor drives the spectral sensor 4 accordingly to collect first spectral information about light which is reflected by the object 8 in the form of a spectral image or a spectrum $S_A$ and which incidents into the spectral sensor 4. The spectrum $S_A$ can be stored in a memory, storage or the like of the reflectometer 1.

For the second measurement, the calibrated light source 2 is switched on, e.g. by the processor 5. Now, ambient light emitted from the ambient light source 7 and light from the calibrated light source 2 illuminate the object of interest. The spectral sensor 4 collects second spectral information in the form of a spectral image or a spectrum $S_{A+F}$ for the light reflected from the object 8 origination from the calibrated light source 2 and the ambient light source 7. Hence, the reflected light includes light from the ambient light source 7 and light from the calibrated light source 2.

Additionally, at the same time of the second measurement and the same time as the spectral sensor 4 is driven by the processor 5, the processor 5 also drives the depth sensor 3 which determines a distance between the depth sensor 4 and the object 8 by capturing a depth map D. It is assumed that the relative distance between object 8 and reflectometer 1 is the same in both measurements. Of course, the point of time of driving the depth sensor 3 is only exemplary, and, in principle, the depth sensor 4 can be driven at any point of time for obtaining the depth map D.

The spectra $S_A$ and $S_{A+F}$, the depth map D and other parameters may be stored by the processor 5 in a memory, storage or the like.

Figure 4:
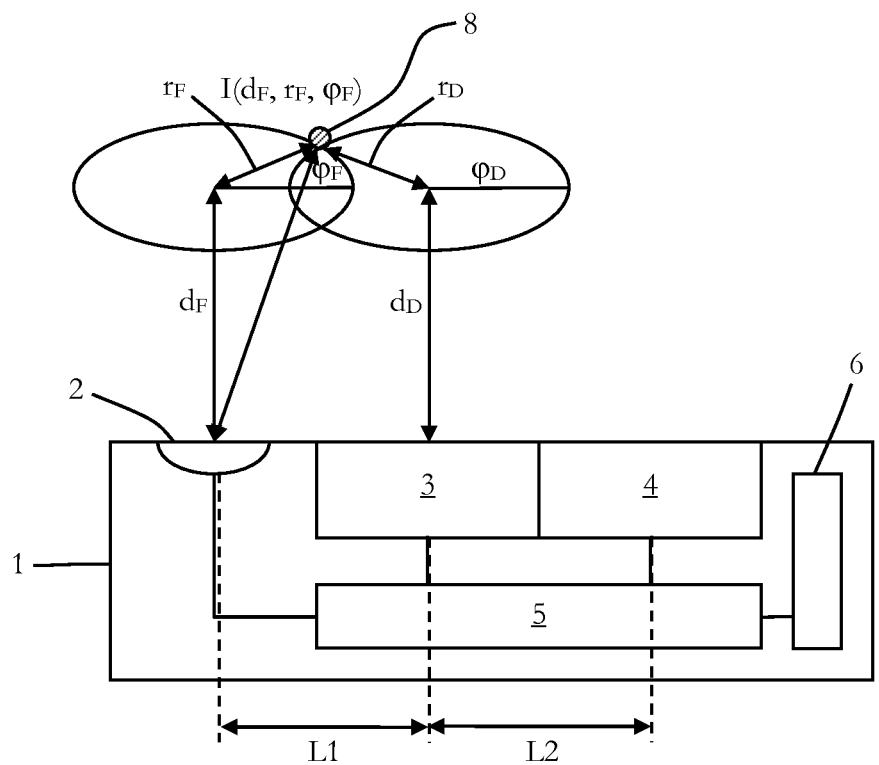
FIG. 4 illustrates a coordinate transformation.

After having performed the two measurements, the processor 5 calculates the absolute reflectance spectrum, as follows and as also illustrated in FIG. 4:

First, a spectrum $S_F$ is calculated, which represents light intensities reflected from the object 8 as if only light were reflected from the object 8 originating from the light source 2. This is done by subtracting the spectrum $S_{A+F}$ obtained during the second measurement where the light source 2 was switched on and the spectrum $S_A$ obtained in the first measurement where the light source 2 was switched off from each other:

$$S_F = S_{A+F} - S_A$$

Second, the absolute power $I_F$ of the calibrated light source 2 at the position of the object 8 is calculated by the processor 5.

In the coordinate system of the depth sensor 3 the object 8 is located at $(d_D, r_D, \varphi_D)$, sec also FIG. 4. This can be directly derived from the acquired depth map D which includes the information of the distance of the object 8 with respect to the depth sensor 4.

The processor 5 performs a simple coordinate transformation T, which results in the coordinates $(d_F, r_F, \varphi_F)$ in the coordinate system of the calibrated light source 2:

$$(d_F, r_F, \varphi_F)^T = T*(d_D, r_D, \varphi_D)^T$$

These coordinates $(d_F, r_F, \varphi_F)$ can be used for calculating the absolute incident power $I_F$, as introduced before:

$$I_F = I(d_F, r_F, \varphi_F).$$

Finally, the absolute reflectance R is obtained by dividing the reflected power $S_F$ with the incident power $I_F$:

$$R = S_F / I_F$$

As mentioned above, in the present embodiment the depth sensor 3 and the spectral sensor 4 are very close to each other such that the influence of the distance between them is negligible. In other embodiments, the distance between the depth sensor 3 and the spectral sensor 4 can be considered by performing another coordinate transformation, for example, into the coordinate system of the spectral sensor 4. However, then the classical parallax problems, such as occlusion, may arise.

In the present embodiment, the calculation was done for a single point of an object. In other embodiments, the depth sensor and/or the spectral sensor may be two-dimensional (2D) sensors such that also a complete 2D reflectance measure may be performed in such embodiments. Moreover, the single point measurement as done in the embodiment discussed above can also be repeated for multiple points of an object.

The reflectometer 1 can be an extra mobile device, as discussed above, or it may be fully integrated in a device or even in an already existing device, such as a mobile device like mobile phones or tablets etc. and as also discussed above.

Figure 5:
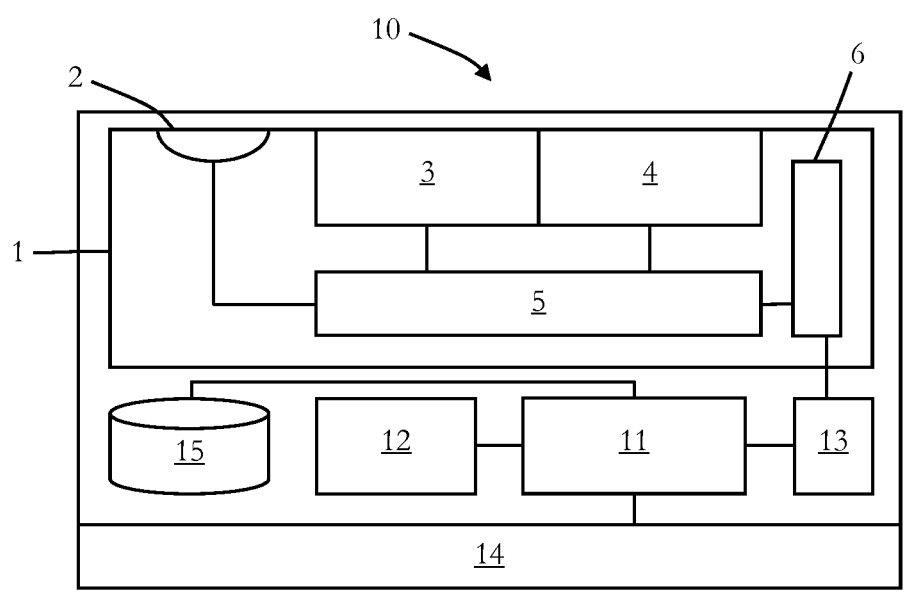
FIG. 5 illustrates an embodiment of a mobile device with the reflectometer of FIG. 1.

In the following, exemplary, a mobile device (phone) 10 including the reflectometer 1 of FIGS. 1 to 4 is discussed under reference of FIG. 5. As the reflectometer 1 corresponds in its functionality to the reflectometer 1 discussed above, a repetition of its description is omitted and it is fully referred to the disclosure above in this regard.

The mobile device 10 has a processor 11, which is connected to a (random access) memory 12, an interface 13, a display 14 (based on light emitting diode, organic light emitting diode technology or the like) and a storage 15 (e.g. solid state drive, hard disk, compact disc or the like) including a database.

The processor 11 alone or in combination with anyone of 1 to 6 and 12 to 15 can be considered as a circuitry as discussed above.

The processor 11 communicates with the reflectometer 1 over the interface 13 and the interface 6 of the reflectometer 1.

The reflectometer 1 can calculate a reflectance spectrum R as discussed above and can communicate it to the processor of the mobile device 10 (in other embodiments, for example, only one processor may be provided which controls the mobile device and the reflectometer).

The database in storage 15 includes multiple entries for reflectance spectra which are associated with specific objects or object characteristics.

The processor 11 can use the reflectance spectrum R received from the reflectometer 1 and can search in the database of storage 15 for a respective corresponding reflectance spectrum. Thereby characteristics of the object for which the reflectance spectrum R has been measured and calculated can be obtained or identified.

The objects which can be investigated and the applications of the present disclosure are manifold.

For example, the reflectometer 1 or the mobile device 10 can be used for investigating food. Reflectance spectra of food and its respective characteristics, e.g. freshness, calories content, sugar content in fruits, etc., can be determined in advance and can be stored in the database. By analyzing food with the reflectometer 1 or mobile device 10, a respective reflectance spectrum can be found in the database and the associated characteristics can be identified and displayed, for example, on display 14.

Similarly, in cosmetics a skin tone or the like can be determined by comparing a reflectance spectrum of a skin of a customer and comparing it with predefined reflectance spectra for different skin tones stored in a database.

Also in the field of medicine, the reflectometer 1 or mobile device 10 can be used, for example, for analyzing the skin of a patient. Reflectance spectra of skin degenerations, such as melanoma, wounds, diabetic ulcers, etc. can be pre-stored in a database and by measuring the reflectance spectrum of the skin of a patient and by comparing the obtained reflectance spectrum with the prestored reflectance spectra, such skin degenerations can be determined.

In other embodiments, the reflectometer 1 or mobile device 10 can be used for performing white balancing of images taken with a camera, display screens, etc. This can be accomplished by measuring the reflectance spectrum of a scene and analyze on the basis of the obtained reflectance spectrum, for example, which colors should be present in an image taken with a camera. By comparing the colors of the image with the colors which are obtained based on the reflectance spectrum a respective white balancing can be accomplished. Furthermore, the reflectance spectrum of a white plane, e.g. white paper, white wall, etc. could be obtained and analyzed for white balancing.

In other embodiments, the reflectance spectrum of spectral tags can be analyzed and compared with a respective known reflectance spectrum. The spectral tag could be used for anti-counterfeiting applications.

Figure 6:
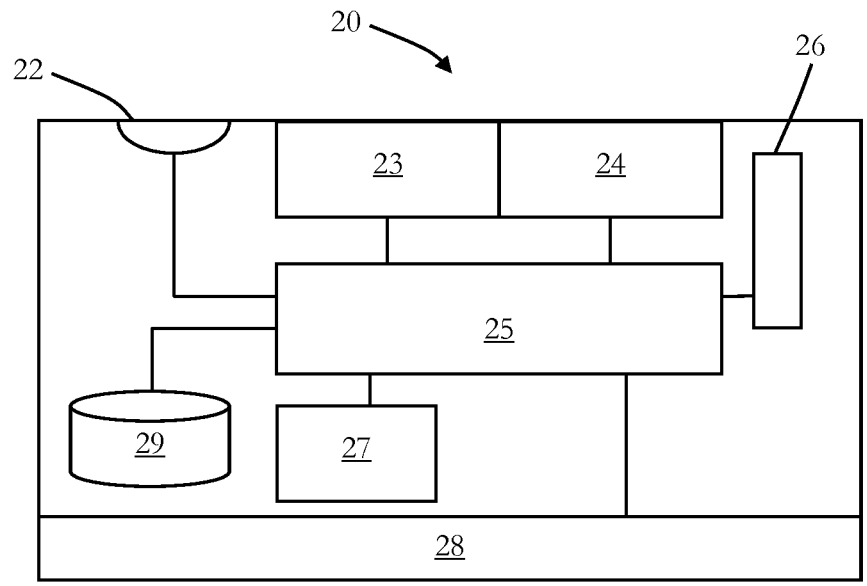
FIG. 6 illustrates an embodiment of an electronic device.

Another embodiment of a reflectometer 20 (or electronic device) is illustrated in FIG. 6. The reflectometer 20 has a light source 22, a depth sensor 23 and a spectral sensor 24, wherein the depth sensor corresponds to the depth sensor 3 of reflectometer 1 above and the spectral sensor 24 corresponds to the spectral sensor 4 of reflectometer 1 above.

The reflectometer 20 has a processor 25, an interface 26, a (random access memory) 27, a display 28 (based LED, OLED, LCD technology or the like) and a storage 29 (hard disk, solid state drive or the like) including a database.

The processor 25 alone or in combination with anyone of 22 to 29 may be considered as a circuitry, as describe herein.

The processor 25 is configured to drive the components 22 to 29. Moreover, the processor 25 is configured perform a calibration of the light source 22, which is a bulb light source in this embodiment. For calibration of the light source 22 the processor 25 can drive the light source 22 to emit light, which is reflected from a predefined object, for example, a sheet having a specific whiteness and measuring the reflected light with the accordingly driven spectral sensor 24. Moreover, the calibration can be performed, for example, in a dark room, such that only light from the light 22 incidents into the spectral sensor 24, but no ambient light.

The other functions of the reflectometer 20 are identical to the reflectometer 1, in particular, as also discussed in connection with FIGS. 2 to 4.

The reflectometer 20 may be a standalone device and it may also be mobile.

The reflectometer 20 can be used in the use cases as discussed in connection with reflectometer 1 and mobile device 10 above, but also in other applications, as discussed below. Of course, the reflectometer 1 and/or the mobile device 10 are applicable for the following use cases.

For example, the reflectometer 20 can be used for remote sensing of environment characteristics. It can also be used for machine vision and optical sorting, since by measuring a respective reflectance spectrum and comparing it with pre-defined reflectance spectra which are stored, for example, in a database in storage 29, objects, products, and characteristics of them can be identified. For instance, food can be sorted, defects of pharmaceuticals can be found, plastic, ceramic, glass, etc. materials can by analyzed, print quality can be analyzed, minerals can be identified for mining or minerology applications, etc.

The reflectometer 20 can also be used for imaging spectroscopy analysis, DNA sequencers, flow cytometers, water monitoring analyzers, bold/urine analyzers, etc. Also here, respective reflectance spectra are pre-defined on the basis of which respective objects can be identified.

In other embodiments, the reflectometer 20 may be used for night vision systems or fuel monitoring systems, etc.

As also discussed above, the reflectometer 20 may be used in medical applications, such as surgery-guided imaging, fluorescence microscopy, endoscopy, ophthalmology/retina imaging, wounds imaging and the like.

In still other embodiments, the reflectometer 20 may be used for industrial gas leaks monitoring, intrusion detection/authentication, forensics and the like.

In the following, a method 30 of determining a reflectance spectrum of an object is discussed. The method 30 may be performed of anyone of the circuitries discussed herein, such as the circuitries of reflectometers 1 and 20 and of the mobile device 10.

At 31, a calibrated light spectrum of the light source is determined, as discussed above. This can include the calibration of the light source, as discussed above.

At 32, first spectral information (spectrum $S_A$, see above) from light reflected from the object is collected, wherein the light source is switched-off, as discussed above.

At 33, second spectral information (spectrum $S_{A+F}$, see above) from light reflected from the object is collected, wherein the light source is switched-on and calibrated light is emitted from the light source, as discussed above.

At 34, a distance between the depth sensor and an object is determined, as discussed above.

At 35, the difference between the second spectral information and the first spectral information is calculated by subtracting them from each other, as discussed above. Thereby the spectrum $S_F$ is obtained, which is indicative of the intensity of the light which is reflected form the object and which origins form the calibrated light emitted from the light source, as discussed above.

At 36, a coordinate transformation is performed, in order to yield the intensity $I_F$ of the calibrated light incident on the object, as discussed above.

At 37, a reflectance spectrum for the object is calculated, based on the distance and the spectral information collected from light being reflected from the object, as discussed above. The reflectance spectrum can be obtained by $R=S_F/I_F$, as discussed above.

At 38, based on the reflectance spectrum R, a characteristic of the object can be identified, as discussed above. The identifying includes comparing of the calculated reflectance spectrum with a number of predefined reflectance spectra, which are stored, for example, in a database, as discussed above.

Figure 7:
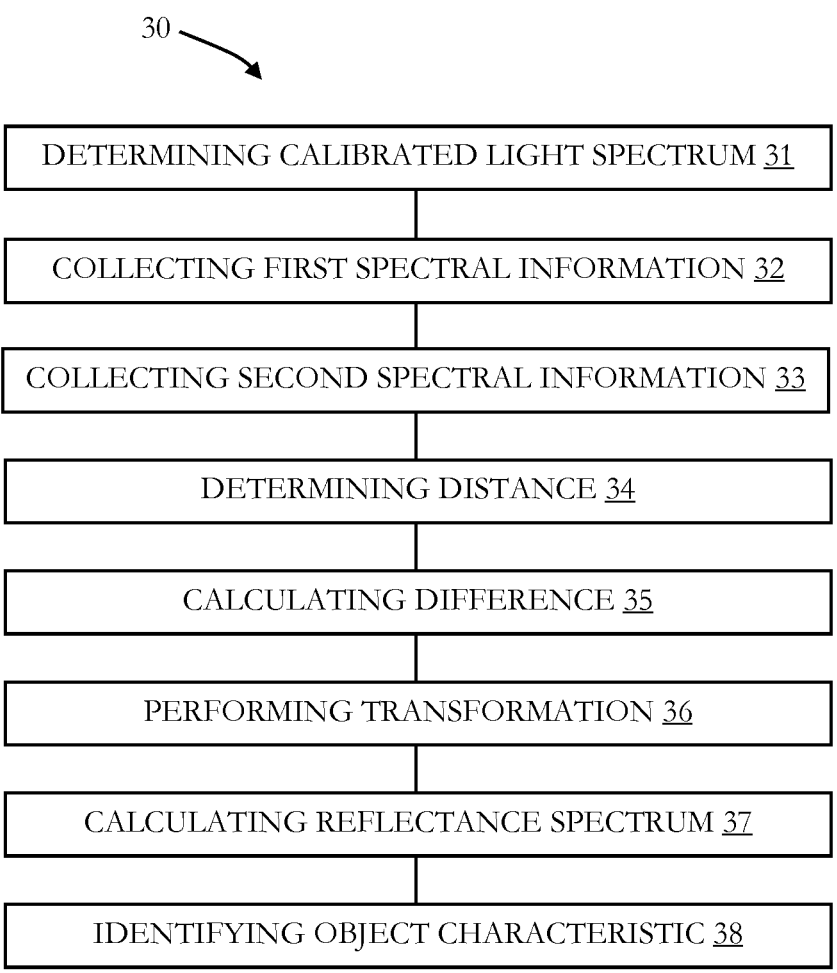
FIG. 7 illustrates a flow chart of an embodiment of a method of determining a reflectance spectrum of an object.

It should be recognized that the embodiments describe methods with an exemplary ordering of method steps. The specific ordering of method steps is however given for illustrative purposes only and should not be construed as binding. For example the ordering of 31, 32, 33 and 34 and also of 35, and 36 in the embodiment of FIG. 7 may be exchanged. Other changes of the ordering of method steps may be apparent to the skilled person.

The method discussed above in under reference of FIG. 7 can also be implemented as a computer program causing a computer and/or a processor, such as processors 5, 11 and 25 discussed above, to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A reflectometer, including:
a depth sensor configured to obtain distance information between the depth sensor and an object,
a light source for emitting light having a calibrated light spectrum,
a spectral sensor configured to collect spectral information from light reflected from the object, and
a circuitry configured to:
calculate a reflectance spectrum for the object based on the distance information and the spectral information collected from light being reflected from the object, the light originating from the light source.

(2) The reflectometer of (1), wherein the light source is a calibrated light source.

(3) The reflectometer of (1), wherein the circuitry is further configured to determine the calibrated light spectrum.

(4) The reflectometer of anyone of (1) to (3), wherein the circuitry is further configured to calculate the reflectance spectrum for the object based on spectral information collected from ambient light being reflected from the object.

(5) The reflectometer of (4), wherein the circuitry is further configured to calculate a difference between the ambient light spectral information being representative of a light spectrum of ambient light being reflected from the object and the calibrated light spectral information being representative of a light spectrum of light originating from the light source and being reflected from the object.

(6) The reflectometer of anyone of (1) to (5), wherein the circuitry is further configured to drive the light source and the spectral sensor such that the spectral sensor collects first spectral information during an off-state of the light source, where the light source does not emit light, and collects second spectral information during an on-state of the light source, where the light source emits light.

(7) The reflectometer of (6), wherein the circuitry is further configured to calculated a difference between the second spectral information and the first spectral information.

(8) The reflectometer of (7), wherein the circuitry is further configured to calculate the reflectance spectrum based on the difference between the second spectral information and the first spectral information and the calibrated light spectrum emitted from the light source.

(9) The reflectometer of anyone of (1) to (8), wherein the circuitry is further configured to identify a characteristic of the object on the basis of the reflectance spectrum.

(10) An electronic device including:
a reflectometer, in particular of anyone of (1) to (9), including:
a depth sensor configured to obtain distance information between the depth sensor and an object,
a light source for emitting light having a calibrated light spectrum,
a spectral sensor configured to collect spectral information from light reflected from the object, and
a circuitry configured to:
calculate a reflectance spectrum for the object based on the distance information and the spectral information collected from light being reflected from the object, the light originating from the light source, and
a circuitry configured to identify a characteristic of the object on the basis of the reflectance spectrum.

(11) A method of determining a reflectance spectrum of an object, including:
obtaining distance information between a depth sensor and an object,
emitting a calibrated light spectrum from a light source,
collecting spectral information from light reflected from the object, and
calculating a reflectance spectrum for the object based on the distance information and the spectral information collected from light being reflected from the object, the light originating from the light source.

(12) The method of (11), wherein the light source is a calibrated light source.

(13) The method of (11), further including determining the calibrated light spectrum.

(14) The method of anyone of (11) to (13), further including calculating the reflectance spectrum for the object based on spectral information collected from ambient light being reflected from the object.

(15) The method of (14), further including calculating a difference between the ambient light spectral information being representative of a light spectrum of ambient light being reflected from the object and the calibrated light spectral information being representative of a light spectrum of light originating from the light source and being reflected from the object.

(16) The method of anyone of (11) to (15), further including collecting first spectral information during an off-state of the light source, where the light source does not emit light, and collects second spectral information during an on-state of the light source, where the light source emits light.

(17) The method of (16), further including calculating a difference between the second spectral information and the first spectral information.

(18) The method of (17), further including calculating the reflectance spectrum based on the difference between the second spectral information and the first spectral information and the calibrated light spectrum emitted from the light source.

(19) The method of anyone of (11) to (18), further including identifying a characteristic of the object on the basis of the reflectance spectrum.

(20) The method of (19), wherein the identifying includes comparing of the calculated reflectance spectrum with a number of predefined reflectance spectra.

(21) A computer program including program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

(23) An electronic device including a circuitry, the circuitry being configured to perform the method of anyone of (11) to (20).

The invention claimed is:

1. A reflectometer, comprising:
a depth sensor configured to obtain distance information between the depth sensor and an object,
a light source for emitting light having a calibrated light spectrum,
a spectral sensor configured to collect spectral information from light reflected from the object, the spectral sensor having a different line of sight to the object than the depth sensor and being immediately adjacent to the depth sensor such that a difference in positions between the spectral sensor and the depth sensor is ignored in calculating a reflectance spectrum, and
a circuitry configured to:
calculate the reflectance spectrum for the object based on the distance information and the spectral information collected from light being reflected from the object, the light originating from the light source.

2. The reflectometer of claim 1, wherein the light source is a calibrated light source.

3. The reflectometer of claim 1, wherein the circuitry is further configured to determine the calibrated light spectrum.

4. The reflectometer of claim 1, wherein the circuitry is further configured to calculate the reflectance spectrum for the object based on spectral information collected from ambient light being reflected from the object.

5. The reflectometer of claim 4, wherein the circuitry is further configured to calculate a difference between the ambient light spectral information being representative of a light spectrum of ambient light being reflected from the object and the calibrated light spectral information being representative of a light spectrum of light originating from the light source and being reflected from the object.

6. The reflectometer of claim 1, wherein the circuitry is further configured to drive the light source and the spectral sensor such that the spectral sensor collects first spectral information during an off-state of the light source and collects second spectral information during an on-state of the light source.

7. The reflectometer of claim 6, wherein the circuitry is further configured to calculate a difference between the second spectral information and the first spectral information.

8. The reflectometer of claim 7, wherein the circuitry is further configured to calculate the reflectance spectrum based on the difference between the second spectral information and the first spectral information and the calibrated light spectrum emitted from the light source.

9. The reflectometer of claim 1, wherein the circuitry is further configured to identify a characteristic of the object on the basis of the reflectance spectrum.

10. An electronic device comprising:
a reflectometer, including:
a depth sensor configured to obtain distance information between the depth sensor and an object,
a light source for emitting light having a calibrated light spectrum,
a spectral sensor configured to collect spectral information from light reflected from the object, the spectral sensor having a different line of sight to the object than the depth sensor and being immediately adjacent to the depth sensor such that a difference in positions between the spectral sensor and the depth sensor is ignored in calculating a reflectance spectrum, and
a circuitry configured to:
calculate the reflectance spectrum for the object based on the distance information and the spectral information collected from light being reflected from the object, the light originating from the light source, and
to identify a characteristic of the object on the basis of the reflectance spectrum.

11. A method of determining a reflectance spectrum of an object, comprising:
obtaining distance information between a depth sensor and an object,
emitting a calibrated light spectrum from a light source,
collecting spectral information from light reflected from the object by a spectral sensor that has a different line of sight to the object than the depth sensor and is immediately adjacent to the depth sensor such that a difference in positions between the spectral sensor and the depth sensor is ignored in calculating a reflectance spectrum, and
calculating the reflectance spectrum for the object based on the distance information and the spectral information collected from light being reflected from the object, the light originating from the light source.

12. The method of claim 11, wherein the light source is a calibrated light source.

13. The method of claim 11, further comprising determining the calibrated light spectrum.

14. The method of claim 11, further comprising calculating the reflectance spectrum for the object based on spectral information collected from ambient light being reflected from the object.

15. The method of claim 14, further comprising calculating a difference between the ambient light spectral information being representative of a light spectrum of ambient light being reflected from the object and the calibrated light spectral information being representative of a light spectrum of light originating from the light source and being reflected from the object.

16. The method of claim 11, further comprising collecting first spectral information during an off-state of the light source and collects second spectral information during an on-state of the light source.

17. The method of claim 16, further comprising calculating a difference between the second spectral information and the first spectral information.

18. The method of claim 17, further comprising calculating the reflectance spectrum based on the difference between the second spectral information and the first spectral information and the calibrated light spectrum emitted from the light source.

19. The method of claim 11, further comprising identifying a characteristic of the object on the basis of the reflectance spectrum.

20. The method of claim 19, wherein the identifying includes comparing of the calculated reflectance spectrum with a number of predefined reflectance spectra.

* * * * *